350-315.    SR 05-25-71    XR    3,580,148

[11] 3,580,148

| [72] | Inventor | Donald M. Harvey<br>Webster, N.Y. |
|---|---|---|
| [21] | Appl. No. | 846,817 |
| [22] | Filed | Aug. 1, 1969 |
| [45] | Patented | May 25, 1971 |
| [73] | Assignee | Eastman Kodak Company<br>Rochester, N.Y. |

[54] PHOTOCHROMIC EXPOSURE CONTROL
10 Claims, 3 Drawing Figs.

[52] U.S. Cl. .................................................. 95/10,
95/64, 350/160, 350/315
[51] Int. Cl. .................................................. G03b 9/02,
G03b 11/00, G02b 5/20
[50] Field of Search .......................................... 95/10 (B),
11, 64; 350/160, 160 (P), 315

[56] References Cited
UNITED STATES PATENTS

| 3,174,537 | 3/1965 | Meyer | 95/10(C)UX |
| 3,270,639 | 9/1966 | Windsor | 95/10(B) |
| 3,302,541 | 2/1967 | Land | 95/10(B) |
| 3,397,023 | 8/1968 | Land | 95/64X |

*Primary Examiner*—Samuel S. Matthews
*Assistant Examiner*—Joseph F. Peters, Jr.
*Attorneys*—Robert W. Hampton and William C. Dixon

ABSTRACT: An exposure control system in a camera includes a plurality of transparent photochromic elements that darken as a function of the illumination intensity to which they are exposed. The elements are exposed separately to scene illumination and are then superimposed in alignment with the camera lens and shutter just before the shutter is operated to effect film exposure.

PATENTED MAY 25 1971 3,580,148
FIG.1
FIG.2
FIG.3
DONALD M. HARVEY
INVENTOR.
BY *William C. Oxson, III*
*Robert W. Hampton*
ATTORNEYS
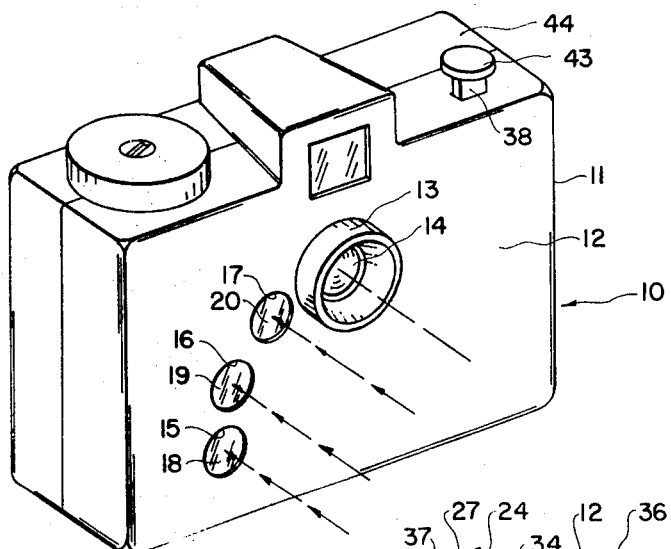
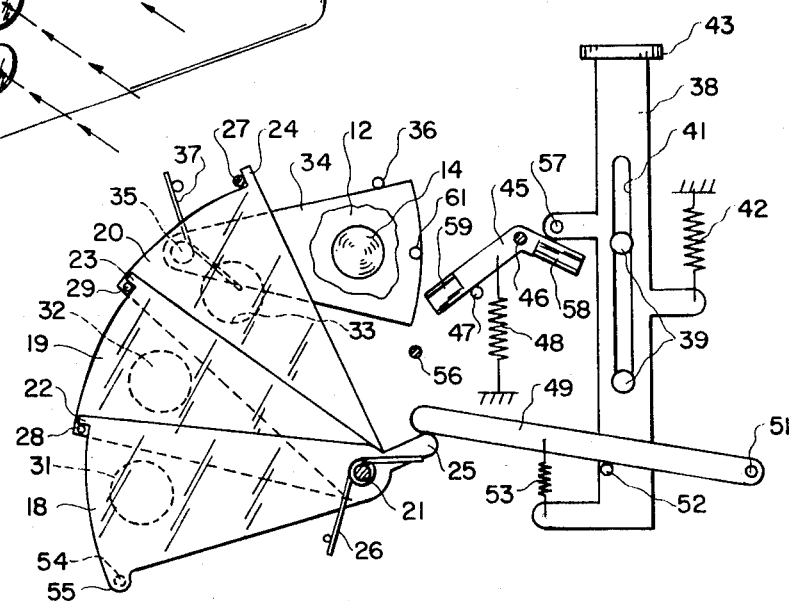

3,580,148

PHOTOCHROMIC EXPOSURE CONTROL

BACKGROUND OF THE INVENTION

1. Field of the Invention

The present invention relates generally to exposure control systems in cameras, and particularly to such systems employing variable density photochromic elements to control film exposure as a function of scene illumination intensity.

2. Description of the Prior Art

In recent years, transparent solid materials have been developed that have the property of darkening upon exposure to light and reverting to their former transparency in darkness. This property obviously suggests employing a plate or similar element of such a "photochromic" material in the optical system of a camera to provide inexpensive means for modulating film exposure as a function of scene illumination intensity without recourse to delicate moving parts and electrical circuitry. Using presently known photochromic materials, such a system would require a considerable time lapse between successive exposures to allow the photochromic material to revert completely to its most transparent condition. Furthermore, such a system would not provide greater depth of field at high illumination levels as in the case of conventional variable aperture systems. Nonetheless, it undoubtedly would be appropriate for very inexpensive cameras or for special-purpose cameras except for the existence of two characteristics of such materials that are incompatible with most photographic applications.

Of these two detracting characteristics, probably the most onerous is that whereby such photochromic materials have the property of responding principally to light within a particular spectral frequency range and have sufficient inherent color to filter out light of certain other frequencies. Accordingly, a single plate of such material cannot provide a spectral response appropriate to most ambient illumination conditions or to the characteristics of commonplace photographic film emulsions. The other troublesome characteristic of such materials is that whereby the degree of darkening which takes place upon illumination thereof appears to progress through the material from its illuminated surface, resulting in a progressive diminution of the density of successively deeper strata. In other words, the darkening of the exposed surface reduces the amount of light reaching a somewhat deeper portion of the material, which therefore becomes less opaque, and so on. Consequently, to achieve the degree of darkening required to attenuate a high level of scene illumination intensity requires the use of a photochromic element of substantial thickness, thereby accentuating its undesirable color filtering characteristic and also prejudicing the design and effectiveness of the camera lens system.

SUMMARY OF THE INVENTION

To overcome the two problems just described, the present invention contemplates providing a camera with a photochromic exposure control system including a plurality of relatively thin elements of photochromic material which are exposed separately to scene illumination and then superimposed in alignment with the camera lens system and shutter just before the shutter is operated to effect film exposure. Thus, the desired spectral characteristics of the exposure control system can be established by using photochromic exposure control elements with respective different response and filtering properties, each of such elements being exposed directly to scene illumination. At the same time, the increased area of the photochromic material exposed directly to scene illumination reduces the overall thickness of such material required to produce a particular desired range of light attenuation.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a perspective view of a camera incorporating a three-element photochromic exposure control device in accordance with the preferred embodiment of the present invention;

FIG. 2 is a somewhat schematic front elevational view of the exposure control device incorporated in the camera of FIG. 1, showing the three photochromic exposure control elements in position to be illuminated separately by scene illumination; and FIG. 3 is similar to FIG. 2, showing the three photochromic exposure control elements in superimposed alignment with the camera lens system.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

The camera 10 depicted in FIG. 1 of the drawing comprises a generally rectangular housing 11 provided with a front wall member 12 which supports a lens mount 13 having an objective lens 14. In external appearance, the only feature of camera 10 which noticeably distinguishes it from a similar conventional camera is the provision in front wall member 12 of three circular openings 15, 16, and 17 located along an arc passing through the optical axis of objective lens 14.

As shown in FIGS. 2 and 3, three relatively thin, sector-shaped blade elements 18, 19 and 20, made of glass or some other transparent photochromic material, are pivotally supported in overlapping relation to one another behind wall member 12 and lens 14 by a stationary pivot stud 21. At their free ends, opposite to stud 21, the three blade elements 18, 19, and 20 are provided with respective abutment ears 22, 23, and 24. The forwardmost blade element 18 is also provided with a lever arm 25 which is biased in a counterclockwise direction to the position shown in FIG. 2 by a relatively weak hairpin spring 26. A stationary abutment pin 27 extends rearwardly from wall member 12 and is adapted to be engaged by abutment ear 24 of the rearwardmost blade element 20 to limit the counterclockwise rotation of that element. Similarly, abutment pins 28 and 29 on blade elements 19 and 20 are adapted to be engaged by the respective abutment ears 22 and 23 of blade elements 18 and 19. Thus, the three blade elements 18, 19, and 20 are positioned in fanlike fashion so that their respective central areas, shown in broken lines as 31, 32, and 33 of FIG. 2, are aligned with the corresponding wall member openings 15, 16 and 17. Consequently, central areas 31, 32, and 33 of blade elements 18, 19, and 20 are exposed separately to scene illumination through the corresponding wall member openings 15, 16 and 17 and change in transparency as a function of scene illumination intensity.

Behind blade elements 18, 19, and 20, a shutter blade 34 of a conventional impact-type shutter is pivotally supported on an intermediate wall member of the camera, not shown, by a stationary pivot stud 35. Shutter blade 34 is biased in a counterclockwise direction against a blocking pin 36 by a spring 37 so that blade 34 normally is aligned with lens 14 and with a corresponding opening in the intermediate wall member, thereby preventing light from reaching photographic film located rearwardly of the intermediate wall member.

A shutter operating slide member 38 is supported within housing 11 by a pair of support rivets 39 extending through an elongate slot 41 and is biased upwardly by a spring 42 so that a pushbutton 43 at its upper end is normally held above an upper wall member 44 of the camera, as shown in FIG. 1. An impact member 45 is pivotally supported by a pivot pin 46 and is biased in a counterclockwise direction against a stationary pin 47 by a relatively heavy tension spring 48. Below impact member 45, a lever 49 is pivotally supported by a pivot stud 51 and is held in contact with a pin 52 on slide member 38 by a spring 53. When slide member 38 is in its raised position, the free end of lever 49 is located directly above the corresponding end of lever arm 25 projecting laterally from the pivoted end of blade element 18.

As the camera operator depresses pushbutton 43 to produce a photograph, the initial downward movement of slide member 38 causes lever 49 to pivot in a counterclockwise direction about pivot stud 51 as spring 53 maintains lever 49 in abutment with pin 52. The free end of lever 49 therefore presses downwardly on lever arm 25 and rotates the forwardmost blade element 18 in a clockwise direction. As such movement of blade element 18 takes place, a stud 54 projecting rearwardly from an ear 55 thereof successively engages the edges of the other two blade elements 19 and 20 so that all three elements 18, 19, and 20 are rotated into superimposed alignment with lens 14 and into lateral engagement with a stationary stop pin 56, as shown in FIG. 3. Accordingly, the three previously illuminated central areas 31, 32, and 33 of blade elements 18, 19, and 20 are now superimposed in alignment with lens 14 so that light subsequently admitted through lens 14 will be modulated by passing through all three such areas. Obviously, since only the central areas 31, 32, and 33 of blade elements 18, 19, and 20 need be made of photochromic material, the blade elements would not have to be made entirely of such material, as heretofore described, but could comprise metal or plastic frame members provided with transparent photochromic plates or discs in central openings thereof.

As the above-described initial downward movement of slide member 38 is taking place, a pin 57 carried on slide member 38 and provided with a sloped end face engages the rearward edge of a correspondingly sloped shorter leg 58 of impact member 45 and drives member 45 in a clockwise direction, thereby causing a similarly sloped longer leg 59 of member 45 to cam past a sloped end face of a stud 61 supported on shutter blade 34. When further counterclockwise movement of blade elements 18, 19, and 20 is blocked by stop pin 56, as shown in FIG. 3, spring 53 stretches to allow the downward movement of slide member 38 to proceed. As this occurs, pin 57 continues to rotate impact member 45 in a clockwise direction, against the influence of spring 48, until pin 57 has moved beyond the end of leg 58. Thereupon, impact member 45 rotates rapidly counterclockwise back to its original position in abutment with stop pin 47, thereby causing the rearward edge of its longer leg 59 to strike shutter stud 61 and to momentarily drive shutter blade 34 downwardly, i.e., clockwise, out of alignment with lens 14. As shutter blade 34 is returned to its raised position by spring 37 to terminate the exposure, impact arm 45 is beyond the movement path of shutter stud 61. Thereafter, when the camera operator releases pushbutton 43, spring 42 returns slide member 38 to its raised position as pin 57 cams leg 58 aside to allow pin 57 to pass. Concurrently, lever 49 is raised by pin 52 to allow spring 26 to rotate blade elements 18, 19, and 20 counterclockwise back into alignment with the respective wall member openings 15, 16, and 17. Accordingly, the camera is now restored to the condition shown in FIGS. 1 and 2 so that another exposure can be made after the film has been advanced.

From the foregoing description, it will be apparent that the area of blade elements 18, 19, and 20 exposed to ambient scene illumination is three times as great as the area which those elements present to the lens system when they are superimposed in alignment therewith, and that the different blade elements can have different spectral qualities which combine to provide the light modulation characteristics required to produce proper film exposure.

As previously mentioned, the recovery speed of the photochromic material employed in the blade elements may be fairly slow. Therefore, if the operator were to shift the camera from a brightly illuminated scene to a darker scene and then immediately depress the pushbutton, insufficient film exposure might occur due to the inability of the photochromic elements to respond quickly enough to the lower illumination intensity. Accordingly, the housing openings 15, 16, and 17 could be provided with appropriate additional shutter means, also operated by slide member 38, so that the photochromic elements would not be exposed separately to scene illumination until just before those elements are moved into alignment with the objective lens.

The invention has been described in detail with particular reference to the preferred embodiment thereof, but it will be understood that variations and modifications can be effected within the spirit and scope of the invention.

I claim:

1. A device for modulating light passing along a predetermined light path as a function of the intensity of the source of such light, said device comprising a plurality of variable transparency photochromic elements movable between respective first positions at which predetermined areas of said elements are exposed separately to the source of light and respective second positions at which said predetermined areas of said elements exposed separately to the source of light are superimposed in the predetermined light path.

2. The device claimed in claim 1 wherein a spectral response characteristic of at least one of said photochromic elements is different from a corresponding spectral response characteristic of a different one of said photochromic elements.

3. The device claimed in claim 1 further comprising a shutter member adapted to obstruct the predetermined light path except when said photochromic elements are in their respective second positions.

4. In a camera having a housing, a lens a shutter operable to admit light from an illuminated scene through the lens into the housing, and means for operating the shutter, an exposure control device comprising:
   a. a plurality of variable transparency photochromic elements; and
   b. means for supporting said elements for movement between respective separated positions in which said elements are exposed separately to the light from the scene and respective superimposed positions in which said elements are superimposed in alignment with the lens.

5. The device claimed in claim 4 further comprising means operatively connecting said photochromic elements to the shutter operating means for moving said photochromic elements from their respective separated positions to their respective superimposed positions prior to operation of the shutter by the shutter operating means.

6. The device claimed in claim 4 wherein said photochromic elements include sector-shaped blade members supported for fanlike pivotal movement about a common pivot axis.

7. The device claimed in claim 4 wherein said photochromic elements are located within the housing and wherein the housing includes aperture means through which the light from the scene is admitted to said elements when said elements are in their respective separated positions.

8. The device claimed in claim 4 wherein the spectral response and modulation characteristics of at least one of said photochromic elements are different from the spectral response and modulation characteristics of another of said photochromic elements.

9. For use with a camera having means operable for admitting light along a predetermined path to film in the camera, an exposure control device comprising:
   a. means including a plurality of photochromic elements for varying the transmissibility of light received thereby as a function of the intensity of the received light; and
   b. means for admitting light separately to each of said photochromic elements and then superposing said elements in the predetermined path prior to operation of the means for admitting light to the film.

10. The device claimed in claim 9 wherein a light-transmitting characteristic of one of said photochromic elements differs from the corresponding light-transmitting characteristic of another of said elements.